US007072461B2

(12) United States Patent  
Padawer et al.

(10) Patent No.: US 7,072,461 B2
(45) Date of Patent: Jul. 4, 2006

(54) MERGING VARIOUS REQUEST METHODS INTO A SINGLE UNIFIED USER INTERFACE

(75) Inventors: Andrew D. Padawer, Sammamish, WA (US); Kevin A. Kennedy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 09/945,588

(22) Filed: Aug. 30, 2001

(65) Prior Publication Data

US 2002/0052196 A1    May 2, 2002

Related U.S. Application Data

(60) Provisional application No. 60/237,287, filed on Oct. 2, 2000.

(51) Int. Cl.
    *H04M 1/27*  (2006.01)
(52) U.S. Cl. .................... 379/355.09; 379/201.04; 379/355.1
(58) Field of Classification Search ..............................
    379/355.01–355.1, 356.01, 88.03, 142.01,
    379/354, 357.03, 201.04; 455/414.1, 564;
    341/26, 23; 345/173
    See application file for complete search history.

(56) References Cited

U.S. PATENT DOCUMENTS

| 4,885,580 | A | * | 12/1989 | Noto et al. ................ 341/23 |
| 4,980,910 | A | * | 12/1990 | Oba et al. ............. 379/357.03 |
| 5,561,705 | A | * | 10/1996 | Allard et al. ............. 455/564 |
| 5,677,949 | A | * | 10/1997 | Macor .................... 379/354 |
| 5,708,804 | A | | 1/1998 | Goodwin et al. ......... 395/603 |
| 5,977,887 | A | * | 11/1999 | Grimmett ................ 341/26 |
| 6,018,571 | A | * | 1/2000 | Langlois et al. ....... 379/201.04 |
| 6,223,057 | B1 | * | 4/2001 | Sone ..................... 455/564 |
| 6,442,270 | B1 | * | 8/2002 | Simon et al. ......... 379/355.09 |
| 6,462,616 | B1 | * | 10/2002 | Beswick et al. ........ 379/88.03 |
| 6,535,749 | B1 | * | 3/2003 | Iwata et al. ........... 455/556.2 |
| 6,542,591 | B1 | * | 4/2003 | Amro et al. .......... 379/142.01 |
| 6,760,431 | B1 | * | 7/2004 | Haimi-Cohen ........ 379/355.01 |
| 6,760,432 | B1 | * | 7/2004 | Wong et al. .......... 379/356.01 |
| 6,766,017 | B1 | * | 7/2004 | Yang ................... 379/355.02 |
| 6,781,575 | B1 | * | 8/2004 | Hawkins et al. ........... 345/173 |

FOREIGN PATENT DOCUMENTS

| EP | 0 920 168 | 6/1999 |
| EP | 0 951 163 | 10/1999 |
| WO | WO 97/11546 | 3/1997 |
| WO | WO 99/23805 | 5/1999 |

OTHER PUBLICATIONS

Upp, Steven, "Automatic Telephone Number Retrieval" Motorola Technical Developments, Motorola Inc. Schaumburg, Illinois Vo. 19, Jun. 1, 1993, p. 71.

\* cited by examiner

*Primary Examiner*—Fan Tsang
*Assistant Examiner*—Md S. Elahee
(74) *Attorney, Agent, or Firm*—Workman Nydegger

(57) ABSTRACT

Methods and systems for allowing a user to enter a request, such as dialing input, without having to specify, or otherwise commit to, a particular request method. Upon detecting a user input that represents a user request for service, response data is retrieved that represents an appropriate response to the request should the user intend the request to be in accordance with a first request method. However, other response data is also retrieved that represents an appropriate response to the request should the user have intended the request to be in accordance with other request methods. Accordingly, the user need not commit to a particular request method before entering the request, thus unifying and simplifying the request process.

36 Claims, 7 Drawing Sheets

Duplicate Remover Output 401

| |
|---|
| $C_1$ |
| $C_3$ |
| $C_{12}$ |
| $C_{88}$ |

Fig. 4A

First Concatenator Output 402

| | |
|---|---|
| $A_1$ | |
| $A_2$ | From Database A |
| $A_3$ | |
| $A_4$ | |
| ⋮ | |
| $A_n$ | |
| $B_1$ | |
| $B_2$ | |
| $B_3$ | From Database B |
| $B_4$ | |
| ⋮ | |
| $B_m$ | |
| $C_1$ | |
| $C_3$ | From Database C with Duplicator Removed |
| $C_{12}$ | |
| $C_{88}$ | |

Fig. 4B

MERGING VARIOUS REQUEST METHODS INTO A SINGLE UNIFIED USER INTERFACE

CROSS-REFERENCE TO RELATED APPLICATION

The present application claims priority from U.S. provisional patent application Ser. No. 60/237,287, filed Oct. 02, 2000 and entitled "Smart Dialer For Cell Phone", which provisional application is incorporated herein by reference in its entirety.

BACKGROUND OF THE INVENTION

1. The Field of the Invention

The present invention relates to the field of computer user interfaces. Specifically, the present invention relates to the merging of various request methods, such as dialing methods, into a single unified user interface without requiring a user selection of the request method.

2. Background and Related Art

The telephone has been one of the most pervasive inventions of the modem era. It is now common practice for an individual (throughout this specification, called a "caller") to use a telephone to audibly converse in real-time with another individual (throughout this specification, called a "callee") even if the caller and the callee are remotely located. Recently, the types of devices able to support telephonic communication have expanded well beyond what was conventionally thought of as a telephone. For example, digital telephones (hardwired and wireless), and some types of personal computers and Personal Digital Assistants are now able to engage in telephonic communication. Also, telephonic connections are now used to communicate non-audible data outside of the audible range.

Regardless of its physical form or the type of information communicated, each telephonic device is identified on a telephone network by a telephone number. By using a telephonic device to dial the telephone number of another telephonic device, a connection is established between the telephonic devices allowing for real-time communication.

Conventional dialing methods relied heavily on the caller's knowledge of the callee's telephone number. The caller, having knowledge of the desired telephone number, would then enter the telephone number one digit at a time via, for example, a rotary dial, a keypad, or the like. It would, however, be unreasonable to expect that a caller would have knowledge of every potential telephone number that the caller might want to dial. Therefore, numerous technologies exist that allow the user to identify a telephone number that corresponds to a desired callee.

For example, telephone books are published that alphabetically list telephone numbers corresponding to entities such as individuals and business. The entity names are typically listed alphabetically thus allowing a caller to find a particular telephone number given the entity name. This requires that a user obtain access to a telephone book, that the telephone book be of the correct region, that the desired entity be listed in the telephone book, and that the caller makes the effort of searching the telephone book correctly.

Also, a caller may dial an information line, provide the entity name, and receive the corresponding telephone number via an information service. This requires that the user access the information telephone number, which may be a number that is more easily remembered (e.g., 411 or 1-800-555-1212), and requires that the user dial an extra telephone number. Also, there may be a charge associated with the information service, which may be especially frustrating if the information service returns an incorrect telephone number.

Many telephonic devices are now equipped with a technology called "speed dial", which allows a caller to program a telephonic device to accept a shorter number (e.g., a single or double digit number) in lieu of a longer telephone number when dialing. Although this simplifies the dialing process, the caller must still remember what speed dial number is associated with what entity. Also, the number of speed dial numbers available are, by design, limited. Accordingly, there will still be many telephone numbers that cannot be accessed by a speed dial number. Also, the use of speed dial requires some initial time and knowledge to program a particular speed dial number.

Callers may also use a call log to dial a telephone number. The user might do this by selecting the call log on the telephonic device, scrolling through a historical list of calls placed or received, select a telephone number when found, and then command the telephonic device to dial the corresponding telephone number. However, this still requires that the caller perform various electronic selections and searches in order to dial.

Telephone books, information services, speed dial, and call logs are just examples of technologies that enable a caller to dial a telephone number without knowing the telephone number beforehand. However, all of the conventional methods suffer in that they require relatively significant user effort to obtain and dial a desired telephone number if the telephone number is not already known. In particular, if the dialing method is other than a default method, the caller expends effort to select an alternative dialing method.

The amount of user effort is increased should the first dialing method selected not result in the desired telephone number being selectable. For example, the caller might search a call log only to find that the desired telephone number is not present in the call log at all. From there, the caller might select a contacts list and search through the contacts list for the telephone number, only to find that the telephone number is not listed in the contacts list. The user might then search the speed dial numbers at last resulting in the telephone number.

Accordingly, what are desired are systems, methods and computer program products for find and dialing a telephone number with reduced user effort.

SUMMARY OF THE INVENTION

Methods and systems are described for allowing a user to enter a request without having to specify, or otherwise commit to, a particular icequest method. In one example, the request is for dialing a telephone number in which case the request method may be, for example, dialing with the area code first, dialing just the local number without the area code, entering the first name of the desired callee, entering the surname of the desired callee, or the like.

In particular, upon detecting a user input that represents a user request for service, response data is retrieved that represents an appropriate response to the request should the user intend the request to be in accordance with a first request method. However, other response data is also retrieved that represents an appropriate response to the request should the user have intended the request to be in accordance with other request methods. Accordingly, the user need not commit to a particular request method before entering the request, thus unifying and simplifying the request process.

For example, if the user request was in the form of dialing input, the caller need not specify whether the number is from the call log, a contacts list, whether the caller is engaging speed dial, whether the caller is first dialing the area-code or whether the caller is just dialing the local number. Responses appropriate to many different dialing methods are returned. Since the user is not required to select a dialing method, and since the user need not manually navigate databases such as contacts and call log databases, the dialing process is substantially simplified from the user's perspective. This is especially useful in devices that have limited input interfaces such as telephones.

In one embodiment, the response data is obtained by filtering the request against the database entries by searching for matches according to multiple request methods. For example, if a caller enters a series of numbers, the filter will search for matches should the user intend to dial the area code first, other matches should the user intend to just dial the local number, other numbers should the user be entering a first name, and yet other matches should the user be entering a surname. In order to reduce response time and unnecessary processing, the filter may intelligently determine whether filtering is warranted in light of each incremental request input (e.g., each dialed digit). Thus, filtering might not occur for each incremental request input thereby reducing response time. This is especially useful in devices that have relatively limited processing resources.

The response data thus represents entries that match the request using a variety of different matching criteria. In addition, the response data may originate from a variety of different databases having different data formats. Once the various response entries are received back from the filter, the entries are passed to a data interface that then formats the entries to appear homogeneous despite being from different databases. The homogeneous data structures are then used to render the display thus resulting in a unified appearance to the user. The user need not be aware that such similarly appearing entries actually originated from diversely different databases.

Thus, the principles of the present invention provide an improved mechanism for allowing a user to enter a request, processing the request to return entries presupposing a variety of different request methods, and then unifying the various response for display to a user. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates a data structure that represents the output from the duplicate remover of FIG. 3;

FIG. 4B illustrates a data structure that represents the output from the first concatenator of FIG. 3;

DETAILED DESCRIPTION OF THE INVENTION

The present invention extends to systems, methods and computer program products for merging a number a request or dialing methods so as to allow a user enter the request without requiring that the user specify the request or dialing method. Upon detecting a user input that represents a user request for service, response data is retrieved that represents an appropriate response to the request should the user intend the request to be in accordance with a first request method. However, other response data is also retrieved that represents an appropriate response to the request should the user intend the request to be in accordance with other request methods. Accordingly, the user need not commit to a particular request method before entering the request, thus unifying and simplifying the request process. For example, if the user request was in the form of dialing input, the caller need not specify whether the number is from the call log, a contacts list, whether the caller is engaging speed dial, whether the caller is first entering the area-code or whether the caller is just entering the local number.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
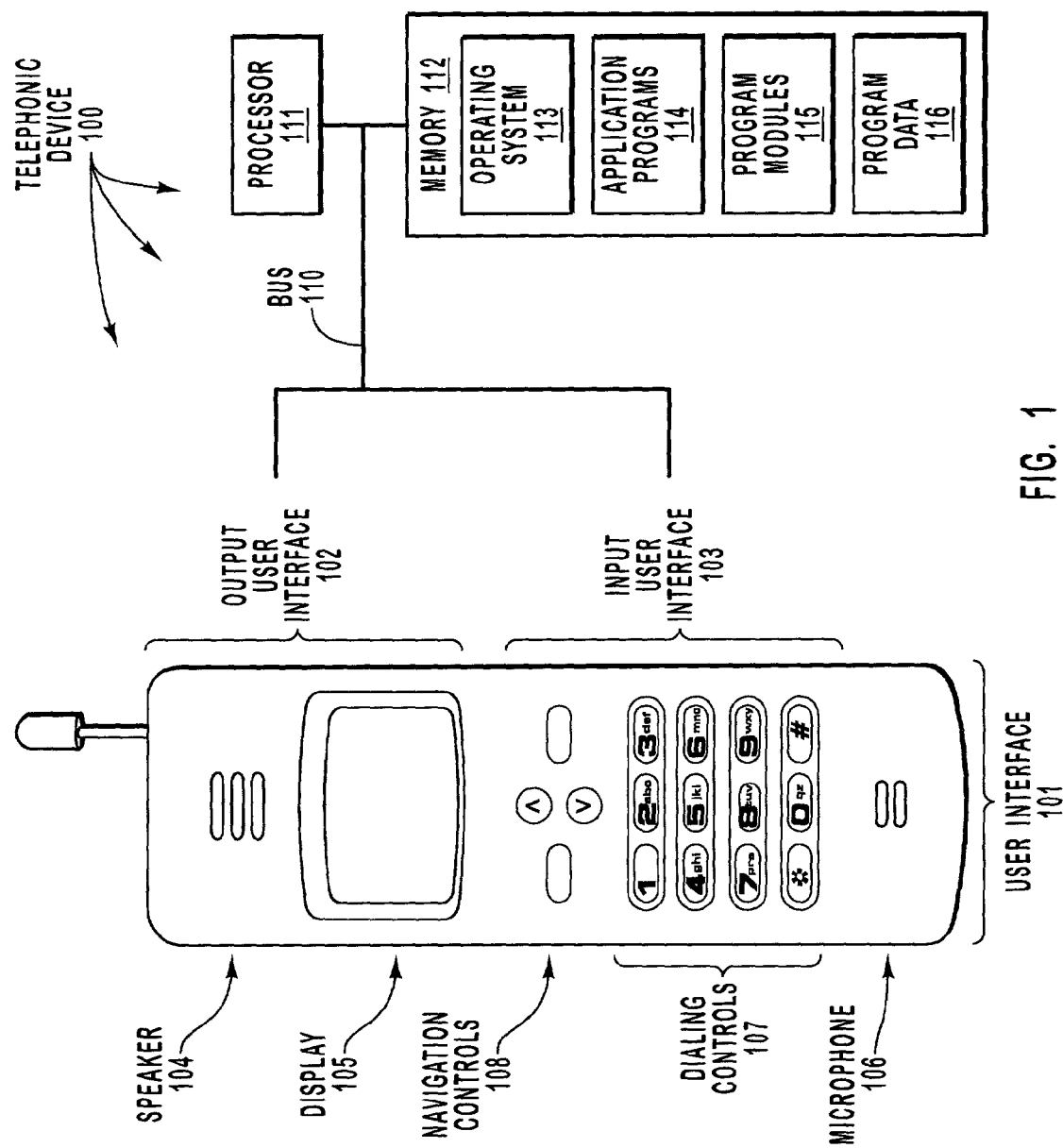
FIG. 1 illustrates an example telephonic device that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, a suitable operating environment for the principles of the invention includes a general purpose computing device in the form of a telephonic device 100. The telephonic device 100 includes a user interface 101 for allowing a user to input information through an input user interface 103, and review information presented via an output user interface 102.

For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for rendering audio information into electronic form. In addition, the input user interface 103 includes dialing controls 107 represented by 12 buttons through which a user may enter information conforming to a variety of dialing methods.

Input user interface 103 also includes navigation control buttons 108 that assist the user in navigating through various entries and options that may be listed on display 105. For example, in accordance with the prior art, users would typically have to use navigation control buttons 108 to selecting a dialing method. For example, one might select a contacts list to navigate through an alphabetical list of contacts. Then, the user could search and select the appropriate contact, and press a dial button to dial the corresponding telephone number. Alternatively, the user might select a call log, navigate through the call log until a particular previous call event (either from an incoming call, or a previous outgoing call) is found, select that event, and then press the dial button to dial the corresponding telephone number. Then again, the user might select a speed dial function, enter the corresponding speed dial number, and then press the dial button. The user might also just enter the telephone number and press the dial button. However, this latter method works only if the user happens to have memorized the desired telephone number.

In accordance with the present invention, these various dialing methods are merged into a single user interface thus alleviating the user from selecting or otherwise having to be concerned about what dialing method is to be used. This is an especially important improvement in the case of limited input devices such as the one shown in FIG. 1 in which there are only 12 buttons available to enter a large set of alphanumeric text, and only a few buttons available to navigate the display 105. In the case of such limited input devices, it would represent a significant improvement in the art to eliminate the requirement to select a dialing method. Furthermore, should a user select a dialing method without knowing beforehand whether or not the selecting dialing method will result in successfully finding the desired telephone number, the user may engage in complex input activities that are ultimately fruitless. If the dialing method was unsuccessful, the user would have to select another dialing method often without knowing whether or not the next dialing method will result in success. By merging the various dialing methods into a single user interface, the user keeps all options open. The dialing information is used to retrieve dialing results in accordance with a variety of dialing methods. The user may then select the correct entry when it is displayed regardless of the dialing method involved. More regarding this principle will be described further below.

Although the user interface 101 has the appearance of a mobile telephone, the unseen features of the user interface 101 may allow for complex and flexible general-purpose processing capabilities. For example, the telephonic device 100 also includes a processor 111 and a memory 112 that are connected to each other and to the user interface 101 via a bus 110. The memory 112 generically represents a wide variety of volatile and/or non-volatile memories that may be employed. The particular type of memory used in the telephonic device 100 is not important to the present invention.

Program code means comprising one or more program modules may be stored in memory 112. The one of more program modules may include an operating system 113, one or more application programs 114, other program modules 11 5, and program data 116.

While FIG. 1 represents a suitable operating environment for the present invention, the principles of the present invention may be employed in any device that is capable of receiving a user-entered request (such as dialing input) in accordance with a variety of request methods (such as a variety of dialing methods). The environment illustrated in FIG. 1 is illustrative only, and by no means represents even a small portion of the wide variety of environments in which the principles of the present invention may be implemented.

FIG. 2A through FIG. 2F illustrate a series of displays 200 as they might appear, for example, on the display 105 of FIG. 1. The display 200 includes an input field 201, a filtered output field 202 and a focus frame 203. However, FIGS. 2A through 2F illustrated the display in different states. Accordingly, each of the display 200, the input field 201, the filtered output field 202 and the focus frame 203 are identified with a suffix A through F that corresponds to the suffix A through F used to identify the figure. Although FIGS. 2A through 2F illustrate one example of how the principles of the present invention may operate, various modifications, additions, and deletions will be apparent to those of ordinary skill in the art after having reviewed this description.

The input field 201 allows the user to enter a request for service without having to specify the request method. This description will focus primarily on an embodiment in which the request is dialing input for placing a telephone call. However, those skilled in the art will recognize, after having reviewed this description, that the principles of the present invention may be extended towards any type of request that has an ambiguous meaning depending on the request method used.

The filtered output field 202 represents a unified area in which responses to the dialing input are presented to the user. Since the user is not required to commit to a particular dialing method prior to entering the dialing input, the response items may be appropriate for a variety of different dialing methods.

The focus frame 203 allows the user to identify what item against which the user desires to take action. For example, while the focus frame 203 highlights the input field 201, the user may enter dialing input into the input field. However, the user may also scroll the focus frame 203 down to one of the items in the filtered output field 202 in order to select that item for dialing.

Figure 2A:
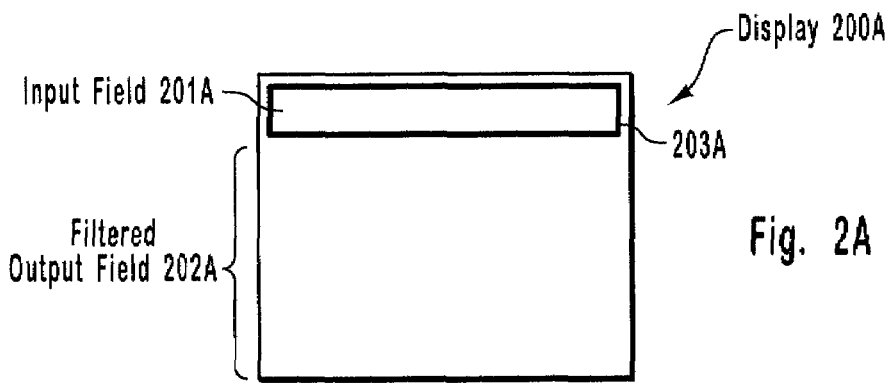
FIG. 2A illustrates an example display for the device of FIG. 1 before any input data is entered in the input field.

FIG. 2A illustrates the display 200A in its initial state with no dialing input entered in the input field 201A, and with no responses presented in the filtered output field 202A. The focus frame 203A highlights the input field 201A thus reflecting that the display 200A is ready to accept dialing input in the input field 201A.

Figure 2B:
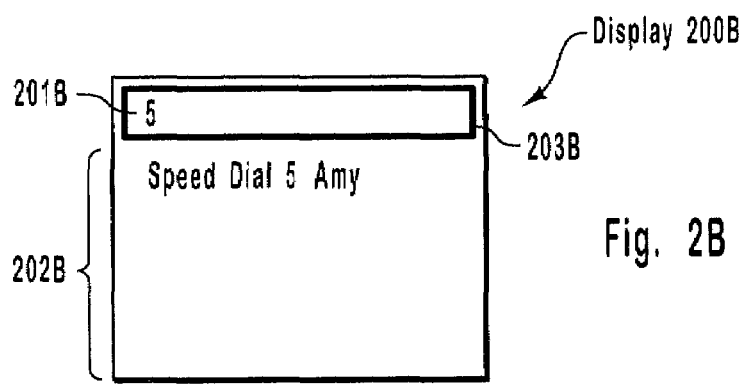
FIG. 2B illustrates the example display after one input digit is input in the input field.

FIG. 2B illustrates the display 200B after the user has entered a "5" in the input field 201B. The focus frame 203B remains over the input field 201B thus allowing this input. In response, the filtered output field 202B then presents an appropriate speed dial entry corresponding to the single digit. In the illustrated embodiment, the filtering of contacts lists and so forth may not begin until two digits are entered in the input field. However, to facilitate convenient access to speed dial numbers, the display may return the appropriate speed dial numbers even though the number of digits in the input field has not yet resulted in responses from any other dialing methods.

Figure 2C:
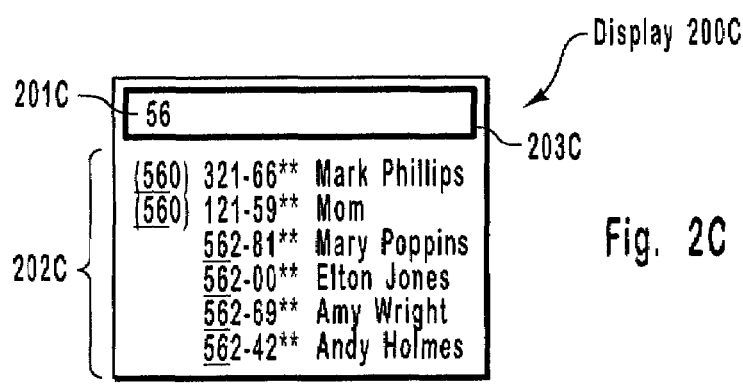
FIG. 2C illustrates the example display after two input digits are input in the input field resulting in the display of a filtered list that represents matches according to several dialing methods.

FIG. 2C illustrates the display 200C after the user also enters a "6" with the accumulated dialing input being "56". The focus frame 203C remains over the input field 201C thus allowing this input. At this stage, filtering occurs as described in further detail below with respect to FIG. 3 through FIG. 5. In response to the filtering operation, the filtered output field 202C illustrates entries from a variety of different dialing methods. The resulting entries are appropriate to the dialing input as emphasized by the underlined portions of the resulting entries. For example, the first two entries presuppose that the dialer is entering the first two digits of the area code first. The remaining four entries presuppose that the dialer is entering the first two digits of the local number.

The local numbers returned may be those entries conform to the dialing input, and that either did not have an area code specified, or those entries that included an area code that corresponds to a default area code. For example, if the telephonic device 100 is currently in the 610 area code, and/or if the 610 area code is the area code of the telephone number of the telephonic device, the filtering may ignore the area code and just match the dialing input against the local number.

As will be described in further detail hereinafter, the resulting entries illustrated in filtered output field 202 may have originated from separate databases in which the entries were represented using incompatible data structures. For example, some of the resulting entries may have originated from a contacts database, some from a speed dial database, and some from a call log. However, notwithstanding that the entries were originally represented at their source using different data structures, the entries are homogenous as they appear in the filtered output field 202.

Figure 2D:
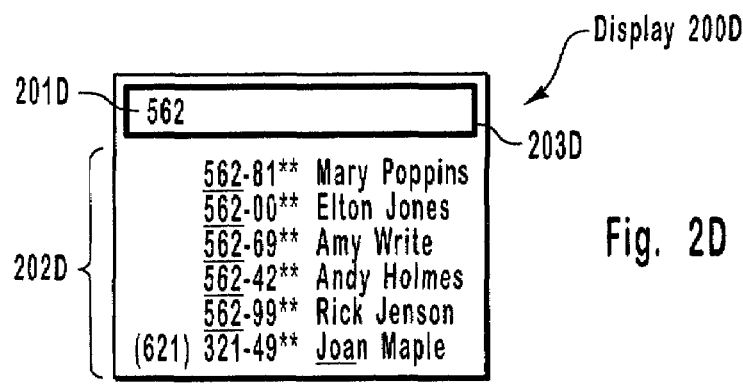
FIG. 2D illustrates the example display after three input digits are input in the input field thus further filtering the list.

FIG. 2D illustrates the display 200D after the user also enters a "2" with the accumulated dialing input being "562". The focus frame 203D remains over the input field 201D thus allowing this input as well. The response entries in the filtered output field 202D are then refreshed to reflect the additional dialing input. As described in further detail below, the response entries in the filtered output field 202 will not always change in response to additional dialing input.

In accordance with the present invention, the telephonic device 100 may avoid further filtering if further filtering would not result in a change in the response entries. For example, suppose that the display illustrates a number of response entries that presuppose the dialing input represents a last name. Users often have numerous entries corresponding to family members who share the same last name. Accordingly, as the name is spelled out, the response entries may not change. Accordingly, unnecessary filtering is largely avoided resulting in processor savings that are especially significant in devices that have lower processing capabilities such as many types of telephonic devices.

The response entries of the filtered output field 202D now include five numbers that presuppose that the dialing input represents the first three digits of a local number. These five entries are identified by having underlined portions that match the dialing input.

In addition, there is one entry that presupposes that the dialing input represents the first name of an individual named "Joan". Referring to the dialing controls 107 of FIG. 1, the digits 0 and 2 through 9 have corresponding alphabetic letters listed on the buttons. As is common knowledge, entered digits may instead represent the corresponding alphabetic letters. For example, the digit "5" also represents the letters "j", "k", or "l". The digit "6" also represents the letters "m", "n", or "o". The digit "2" also represents the letters "a", "b", or "c". Accordingly, the dialing input "562" might represents "Joa". Thus, the entry for Joan matches the dialing input as represented by the underlined portions of the entry.

Figure 2E:
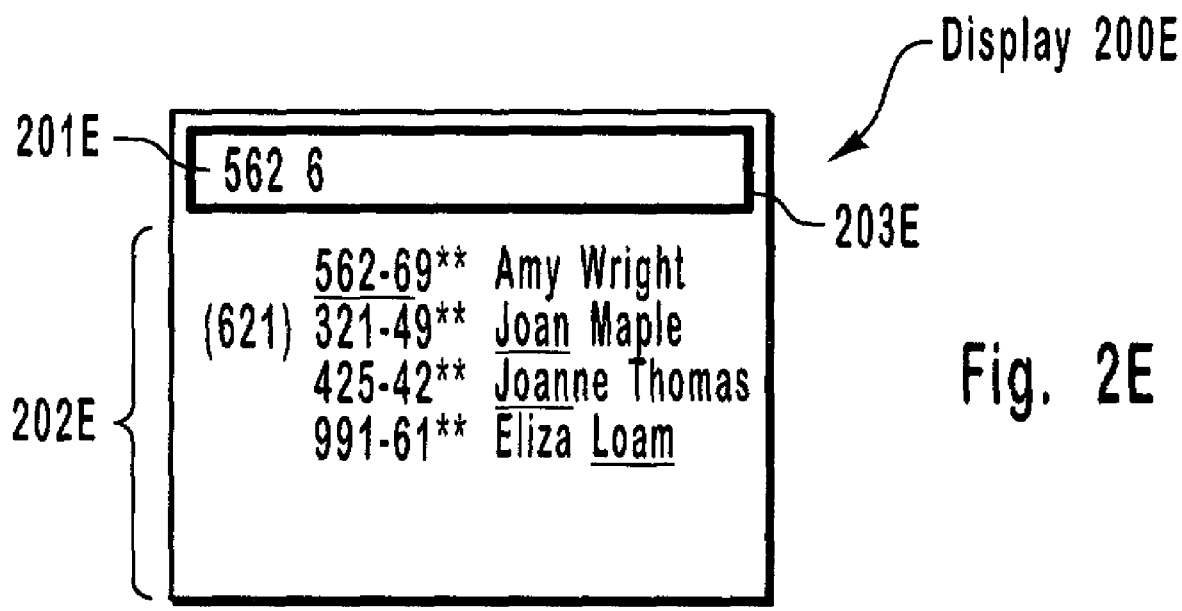
FIG. 2E illustrates the example display after four input digits are input in the input field thus filtering the list to a point that the display may simultaneously list all of the entries in the filtered list.

FIG. 2E illustrates the display 200E after the user also enters a "6" with the accumulated dialing input being "5626". The focus frame 203E remains over the input field 201E thus allowing this input. In this example, the dialing input in the input field 201E is now specific enough that all of the potential matches may now appear in the filtered output field 202E. For example, the top entry presupposes that the dialing input represents the first four digits of the local number. The middle two entries assume that the dialing input represents the first four letters of the first name corresponding to a telephone number. The lowest entry assumes that the dialing input represents the first four letters of the last name corresponding to a telephone number.

Figure 2F:
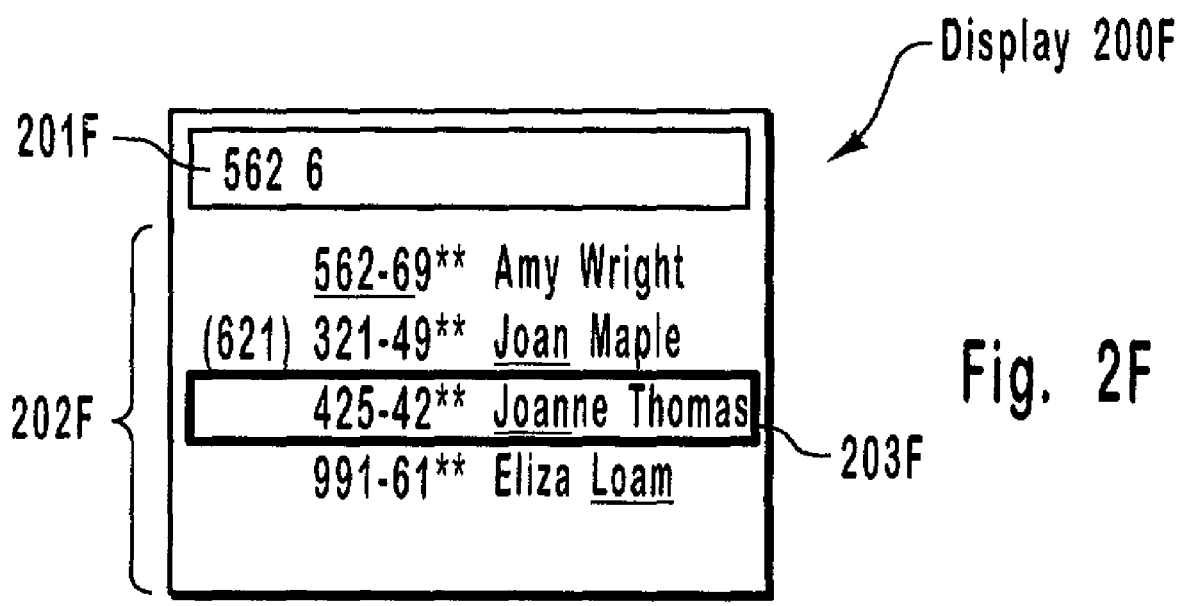
FIG. 2F illustrates the example display after the focus frame has been lowered from the input field to one of the entries in the filtered list.

FIG. 2F illustrates the focus frame 203F moved over a particular entry in the filtered output field 202F. The movement of the focus frame 203F may be accomplished via, for example, the navigation controls 108 of FIG. 1. The user may then select the highlighted entry also via the navigation controls 108. This selection may cause the dialing of the telephone number, or perhaps a menu to appear that offers dialing as one of several options corresponding to the telephone number.

In this whole process, the user never has to navigate to a call log, a contacts list or specify the meaning of the dialing input. Accordingly, the user need not commit to or even specify a dialing method. The user simply enters the dialing input with the desired entry ultimately appearing in the filtered output field regardless of the source of the entry and regardless of the intended dialing method. Although the user experience is greatly simplified, there is significant work performed behind the scenes in order to enable this user experience. In particular, referring to FIG. 1, this work may be accomplished via the user interface 101 interacting with processor 111 and the various components of memory 112 as is now described with reference to FIG. 3 through FIG. 5.

Figure 3:
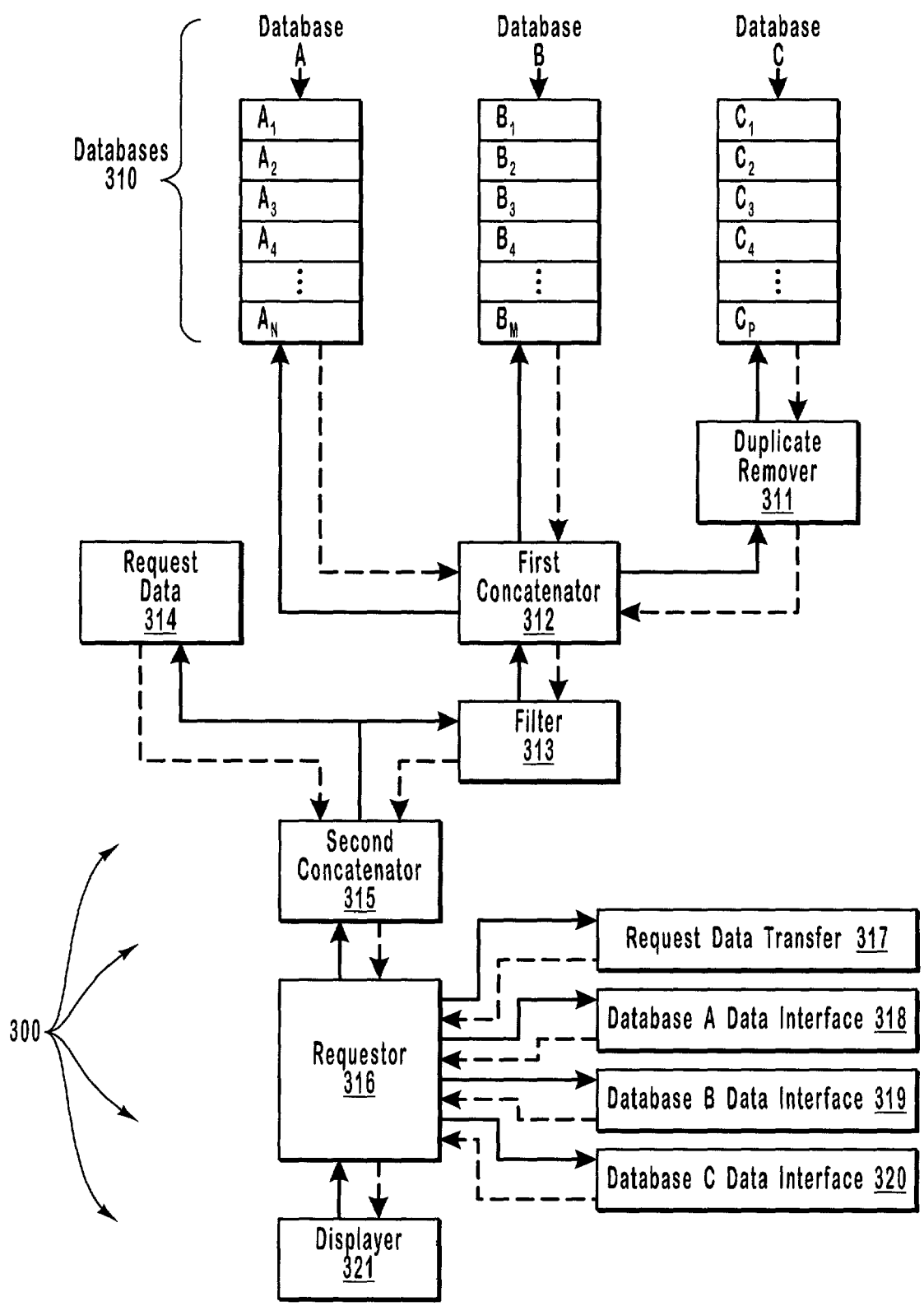
FIG. 3 schematically illustrates an example architecture that may implement the principles of the present invention to generate the displays of FIGS. 2A through 2F.

FIG. 3 schematically illustrates an architecture 300 that may implement the features of the present invention. Each of the elements of the architecture 300 may be hardware, software, or a combination of hardware and software. In the embodiment described, each of the elements of the architecture 300 may be software modules that are emulated when the processor 111 of FIG. 1 executes one of the application programs 112 of FIG. 1. While FIG. 3 and the corresponding description illustrate one mechanism for dynamically filtering dialing input to present a unified filtered output, those skilled in the art will recognize, after having reviewed this description, that a variety of other architectures may operate to implement the principles of the present invention.

Throughout FIG. 3, there are solid arrows leading from one module to the next. These solid arrows represent request paths for one or more requests from the module at the tail of the arrow to the module at the head of the arrow. There are also corresponding dashed arrows in the reverse direction of the solid arrow. The dashed arrows represent one or more responses to the one or more requests.

The architecture 300 includes databases 310 such as database A, database B, and database C. The databases are generically labeled to emphasize that the principles of the present invention may operate with many different kinds of databases having a variety of data structures. However, in this description, database A, B and C will often be referred to as a contacts, speed dial, and call log database, respectively. Also, although three databases are shown, the present invention may work with other numbers of databases as well. Furthermore, although the databases are described as having entries that have incompatible data structures between databases, the databases may also have compatible data structures as well.

Databases A, B, and C have entries $A_1$ through $A_N$, $B_1$, through $B_M$, and $C_1$ through $C_P$, respectively. Each entry may represent a telephone number (with or without an area code) with corresponding information. For example, a contacts database may have a name, title, company, fax number, mobile number or address associated with each telephone number. A speed dial database may also include an associated speed dial number. A call log database may also include the call date time and duration.

The displayer module 321 assembles all the data structures necessary for the telephonic device 100 to receiving and present the dialing input in the input field 201 and the filtered output results in the filtered output field 202. The display module 321 does this even though the filtered output results are from different databases. In order to accomplish this, the display module 321 directly or indirectly uses all of the other modules and databases illustrated in FIG. 3.

Specifically, when new information is entered that is to be displayed in the input field 201 of FIG. 2, the displayer 321 asks the requestor module 316 for all the rows of information that are needed to fill in the display. This initial request begins a chain of requests that flow generally upward as illustrated in FIG. 3. The requestor 316 then asks the second concatenator module 315 for the updated request data that is to appears in the input field 201 concatenated with all of the corresponding filtered entries from all of the databases 310. The second concatenator 315 then accesses the request data 314, and requests the updated filtered entries from the filter module 313.

In response, the filter 313 examines the updated request data 314 to determine whether the updated input warrants re-filtering. For example, the filter 313 may compare the previously filtered entries corresponding to the currently viewed items in the filtered output field 202 to see if the updated input would result in any of such items being filtered out. If the updated request data would not result in a change to the viewed data, the filter 313 notifies the second concatenator 315 of this. The second concatenator 315 would then concatenate the new request data to the old filtered data, which would then be returned to the requestor 316. In this case, if the displayer 321 were to scroll down the list in the output field, the filter would check the newly viewed items to see if they also would be eliminated by the most updated filtering.

Filtering often involves significant processing resources. Accordingly, this elimination of unnecessary filtering significantly improves performance by eliminating complex processing operations. Thus, the average response time for responding to an additional input digit may be significantly reduced. Otherwise, there might be a noticeable lag between the time that the user inputs a digit in the input field 201, to the time that the filtered results are illustrated in the filtered output field 202.

If filtering is needed, the filter 313 asks the first concatenation module 312 for the concatenated list of the databases 310 with duplicates removed. The first concatenator 312 then accesses database A and database B. The first concatenator 312 also requests a non-duplicated version of database C from the duplicate remover module 311.

Some of the databases may include entries with substantially duplicated information. For example, there may be numerous entries in the call log database since there may be many incoming calls registered from a particular telephone number. Although it is desirable to have such entries for each event in the context of call log, it is not desirable to have such duplication in the filtered output field 202 where perhaps only a telephone number and an associated name are ultimately displayed. Accordingly, a duplicate remover module 311 examines each entry and removes duplicates. In this case, only one database (database C) characteristically has duplicates. However, this or a similar duplicate remover module may serve any other database for which there may be a high number of duplicate entries.

Upon request for the non-duplicated version of the database C, the duplicate remover 311 accesses database C in order to generate a non-duplicated version of the database C. In one embodiment, the non-duplicated version of database C does not change in response to additional dialing input. Accordingly, access to database C and regeneration of the non-duplicated version may be avoided. Instead, the duplicate remover 311 may simply store the non-duplicated version of database C, and only regenerate the non-duplicated version periodically.

FIG. 4A illustrates a data structure that represents the duplicate remover output 401. In this example, the duplicate remover output 401 only has entries $C_1$, $C_3$, $C_{12}$, and $C_{88}$. The rest of the entries were deemed to be duplicates and thus removed by the duplicate remover 311.

The first concatenator 312 receives and concatenates an instance of the database A, an instance of the database B, and the duplicate remover output 401. The resulting output is illustrated in FIG. 4B as the first concatenator output 402, which is returned to the filter 313.

Figure 4C:
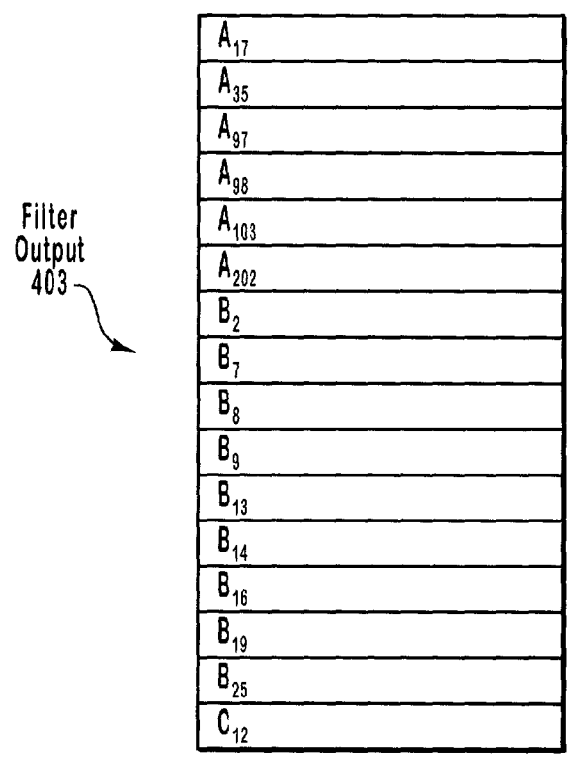
FIG. 4C illustrates a data structure that represents the output from the filter of FIG. 3.

The filter 313 then filters the first concatenator output 402 using the request data entered in the input field 201 as the filtering parameter. In one embodiment, the filter 313 checks for a match against any parameter that the user may intend for the filter to match against. For example, when entering dialing input into input field 201, the user may intend to enter a telephone number with the area code first, enter a telephone number without the area code, enter the first name of a desired callee, enter the last name of a desired callee, or the like. The filter 313 filters against all these parameters. The output from filter 313 is illustrated in FIG. 4C as filter output 403. Note that some of the entries have been removed thus emphasizing that the output is filtered.

Figure 4D:
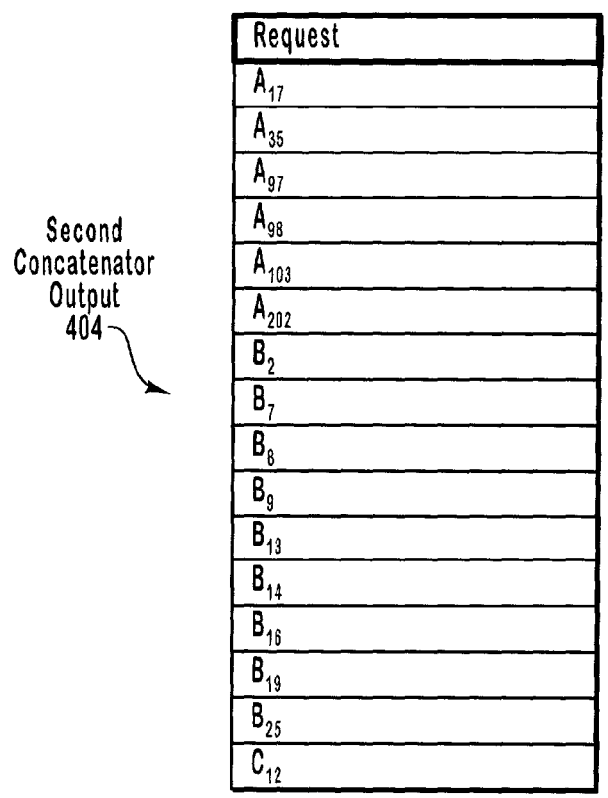
FIG. 4D illustrates a data structure that represents the output from the second concatenator of FIG. 3.

The second concatenator 315 receives and concatenates the request data with the filter output 403. The resulting output is illustrated in FIG. 4D as second concatenator output 404.

The requester 316 receives the second concatenated output 404 and then processes those entries that need to be displayed by the displayer. At this stage, the entries in the second concatenator output 404 represents entries from different databases. Accordingly, each of the entries in the second concatenator output 404 may have significantly different data structures and thus still be incompatible with display in a unified format. Accordingly, the requestor 316 uses various data interfaces 317, 318, 319 and 320 in order to properly format the entries in a unified manner.

The requestor 316 passes the request data to the request data interface 317. The request data interface 317 then passes back the request data formatted for presentation on display 200. For example, the font size of the request data may change depending on how many characters are entered in the input field 201. Specifically, the font size may be reduced as necessary to fit all of the request data in one line in the input field 201.

The requestor 316 passes in any entries from database A that are to be displayed to the database A data interface 318, any entries from database B that are to be displayed to the database B data interface 319, and any entries from database C that are to be displayed to the database C data interface 320. Database A data interface 318, database B data interface 319, and database C data interface 320 then return the entries with equivalent formatting such that the filter output field 202 displays the entries in a unified fashion regardless of the origin of the entry. The request 316 then passes the formatted entries to the displayer 321 for presentation on the display 200.

Figure 5:
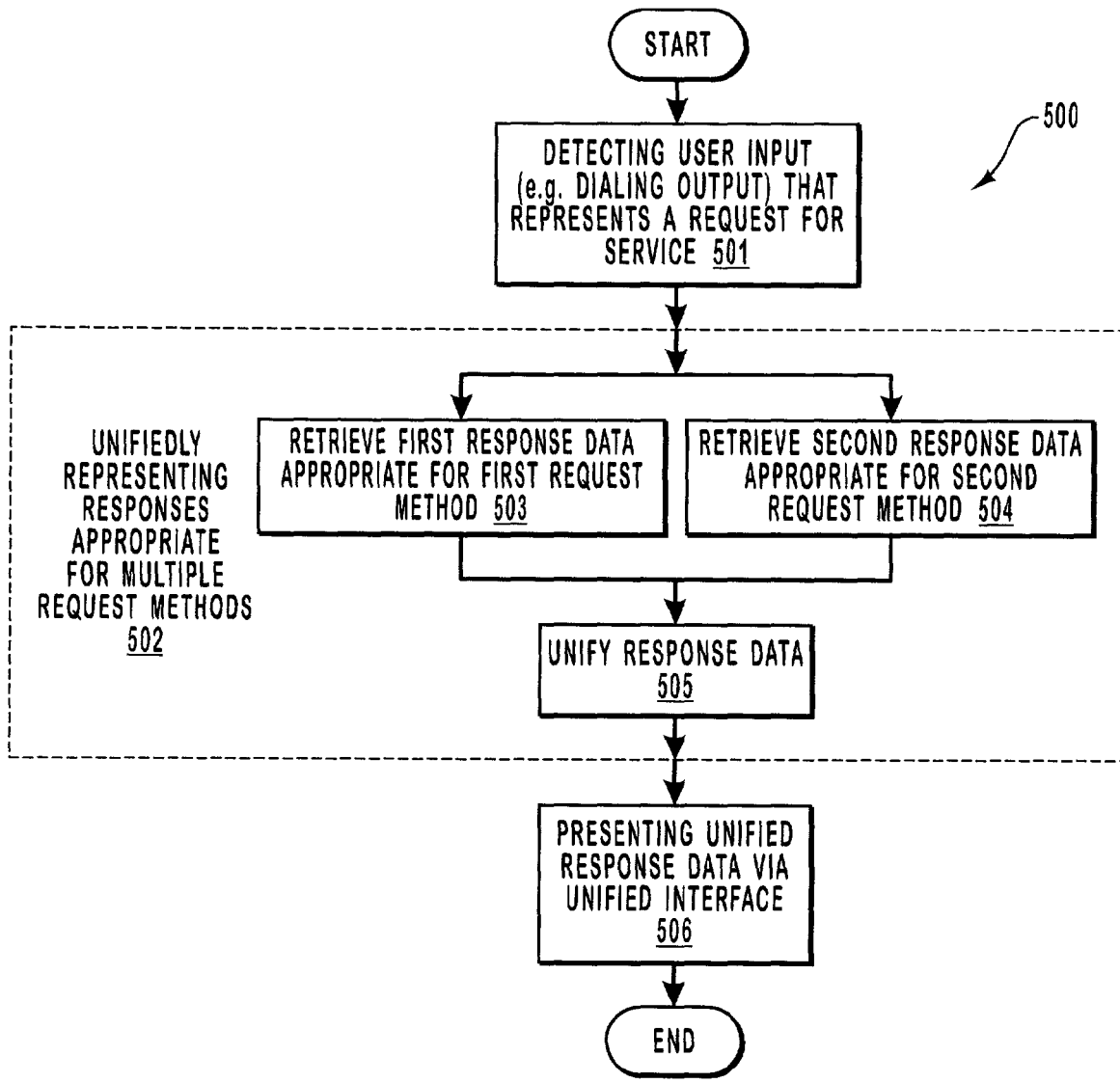
FIG. 5 illustrates a flowchart of a method in accordance with the present invention.

FIG. 5 illustrates a flowchart of a method 500 in accordance with the present invention for allowing a user to enter a request without having to specify the request method. First, the method detects user input that represents a request for service (act 501). In the telephone example illustrated above, the displayer 321 detected dialing input entered in the input field 201. The meaning of the request is ambiguous and depends on the user's intended request (or dialing) method. The user need not commit to any particular request or dialing method up front.

Next, the method performs a step for representing a plurality of responses to the request, the plurality of response in aggregate representing responses that would be appropriate for two or more of the request methods (step 502). In one embodiment, this includes acts 503, 504 and 505. Specifically, the method retrieves response data that represents an appropriate response to the request should the user intend the request to be in accordance with a first request method (act 503). Next, the method retrieves second response data that represents an appropriate response to the request should the user intend the request to be in accordance with a second request method (act 504). For example in the description above, the filter 313 retrieves data from multiple databases 310. Each of these databases represents data appropriate to a specific request method.

For example, database A may include data appropriate for dialing from a contacts list, database B includes data appropriate for speed dialing, and database C includes data appropriate for dialing through a call log selection. In addition, the filter 313 retrieves data appropriate to multiple request methods by filtering on multiple parameters that depend on the user's ambiguous intent. For example, the filter 313 may use the dialing input to match to a telephone number with area code, a telephone number without area code, an associated first name, an associated last name, of the like. Dialing using any of these filtering parameters may be viewed as being a separate dialing method in accordance with the present invention.

The filter 313 may query the requestor 316 for the proper data interfaces for the corresponding entries it is filtering to determine whether the entries satisfy the filtering criteria. Also, the duplicate remover 311 may query the requestor 316 for the proper data interfaces for corresponding entries in order to determine whether the corresponding entries are indeed duplicates.

The method then unifies the first response data and the second response data into a unified data structure (act 505). In the example telephonic device described above, this may be accomplished by the requestor receiving the filtered entries back and using the data interfaces 317, 318, 319 and 320 to format the entries into compatible data structures for viewing. The method then presents the first response data and the second response data to the user so the user may review the first and second response data through a single unified user interface (act 506). In the example, this is accomplished by the displayer 321 receiving the unified data structure from the requestor and displaying the results on the display 200.

Accordingly, the principles of the present invention allow a user to enter a request such as via dialing input, without requiring that the user commit to a particular dialing method, and without requiring that the user select a particular database. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for a telephone device that supports multiple request methods and that allows a user to enter a user request for service using said request methods, the device accepting user input, a method for retrieving and merging data responsive to the request methods so as to allow the user to enter the user request without requiring that the user specify the request method, comprising the following:
   a specific act of detecting said user input that represents a service request, the meaning of the service request depending on the user's intended request method, wherein the specific act of detecting said user input comprises a specific act of detecting each of a plurality of characters sequentially input by the user as part of the service request, wherein the plurality of characters comprises numerals or letters or a group of numbers or letters and wherein a first character of the plurality of characters represents a first specific request and a second character of the plurality of characters represents a second specific request that refines the first specific request;
   a specific act of retrieving first response data that represents an appropriate response to the first specific request should the user intend the first specific request to be in accordance with a first request method;
   a specific act of retrieving second response data that represents an appropriate response to the first specific request should the user intend the first specific request to be in accordance with a second request method;
   a specific act of unifying the first response data and the second response data into a first unified data structure after accessing a plurality of databases of said request methods;
   a specific act of retrieving third response data that represents an appropriate response to the second specific request should the user intend the second specific request to be in accordance with a first request method;
   a specific act of retrieving fourth response data that represents an appropriate response to the second specific request should the user intend the second specific request to be in accordance with a second request method; and
   a specific act of unifying the third response data and the fourth response data into a second unified data structure.

2. A method in accordance with claim 1, further comprising the following:
   a specific act of presenting the first response data and the second response data to the user so the user may review the first and second response data through a single unified user interface.

3. A method in accordance with claim 1, wherein the specific act of detecting user input that represents a user request for service comprises the following:
   a specific act of detecting dialing input that represents a user request for service.

4. A method in accordance with claim 3, wherein the specific act of retrieving first response data that represents an appropriate response to the first specific request should the user intend the first specific request to be in accordance with a first request method comprises the following:
   a specific act of retrieving first response data that represents an appropriate response to the first specific request should the user intend the first specific request to be a telephone number.

5. A method in accordance with claim 4, wherein the specific act of retrieving first response data that represents an appropriate response to the first specific request should the user intend the first specific request to be a telephone number comprises the following:
   specific act of retrieving first response data that represents an appropriate response to the first specific request should the user intend the first specific request to be a telephone number with an area code dialed first.

6. A method in accordance with claim 5, wherein the specific act of retrieving second response data that represents an appropriate response to the first specific request should the user intend the first specific request to be a telephone number comprises the following:
   specific act of retrieving second response data that represents an appropriate response to the first specific request should the user intend the first specific request to be a telephone number without an area code dialed first.

7. A method in accordance with claim 5, wherein the specific act of retrieving second response data that represents an appropriate response to the first specific request should the user intend the first specific request to be a telephone number comprises the following:
   specific act of retrieving second response data that represents an appropriate response to the first specific request should the user intend the first specific request to be a dialed first name.

8. A method in accordance with claim 5, wherein the specific act of retrieving second response data that represents an appropriate response to the first specific request should the user intend the first specific request to be a telephone number comprises the following:
   specific act of retrieving second response data that represents an appropriate response to the first specific request should the user intend the specific request to be a dialed surname name.

9. A method in accordance with claim 4, wherein the specific act of retrieving first response data that represents an appropriate response to the first specific request should the user intend the first specific request to be a telephone number comprises the following:
   specific act of retrieving first response data that represents an appropriate response to the first specific request should the user intend the first specific request to be a telephone number without an area code dialed first.

10. A method in accordance with claim 9, wherein the specific act of retrieving second response data that represents an appropriate response to the first specific request should the user intend first specific request to be a telephone number comprises the following:
    specific act of retrieving second response data that represents an appropriate response to the first specific request should the user intend the first specific request to be a dialed first name.

11. A method in accordance with claim 9, wherein the specific act of retrieving second response data that represents an appropriate response to the first specific request should the user intend the first specific request to be a telephone number comprises the following:

specific act of retrieving second response data that represents an appropriate response to the first specific request should the user intend the first specific request to be a dialed surname.

12. A method in accordance with claim 3, wherein the specific act of retrieving second response data that represents an appropriate response to the specific request should the user intend the first specific request to be a telephone number comprises the following:

specific act of retrieving second response data that represents an appropriate response to the first specific request should the user intend the first specific request to be a dialed first name.

13. A method in accordance with claim 12, wherein the specific act of retrieving second response data that represents an appropriate response to the first specific request should the user intend the first specific request to be a telephone number comprises the following:

specific act of retrieving second response data that represents an appropriate response to the first specific request should to user intend the first specific request to be a dialed surname.

14. A method in accordance with claim 1, wherein the specific act of retrieving first response data that represents an appropriate response to the first specific request should the user intend the first specific request to be in accordance with a first request method comprises the following:

a specific act of retrieving a first portion of the first response data from a first database, the first portion containing one or more entries from the first database;

a specific act of retrieving a second portion of the first response data from a second database the second portion containing one or more entries from the second database, at least some of the entries in the first portion having a different data structure format that at least some of the entries in the second portion.

15. A method in accordance with claim 14, wherein the specific act of retrieving a first portion of the first response data from a first database comprises the following:

a specific act of retrieving the first portion of the first response data from a contacts database.

16. A method in accordance with claim 14, wherein the specific act of retrieving a first portion of the first response data from a second database comprises the following:

a specific act of retrieving the first portion of the first response data from a speed dial database.

17. A method in accordance with claim 14, wherein the specific act of retrieving a second portion of the first response data from a second database comprises the following:

a specific act of retrieving the first portion of the first response data from a call log database.

18. A method in accordance with claim 17, further comprising:

a specific act of removing duplicates from the call log database.

19. A method in accordance with claim 1, further comprising:

before the specific act of retrieving the first response data and before the specific act of retrieving the second response data, a specific act of determining that the user input warrants the specific act of retrieving the first response data and the specific act of retrieving the second response data.

20. A method for a telephone device that supports multiple request methods and that allows a user to enter a user request for service using said request methods, the device accepting user input a method for retrieving and merging data responsive to the request methods so as to allow the user to enter the user request without requiring that the user specify the request method, comprising the following:

a specific act of detecting user input that represents a service request, the meaning of the service request depending on the user's intended request method, wherein the specific act of detecting said user input comprises a specific act of detecting each of a plurality of characters sequentially input by the user as part of the user request, wherein the plurality of characters comprises numerals or letters or a group of numbers or letters and wherein a first character of the plurality of characters represents a first specific request and a second character of the plurality of characters represents a second specific request that refines the first specific request; and for the first and second specific request represented by the first and second characters sequentially input by the user, a step for representing a plurality of responses to the first and second specific requests after accessing a plurality of databases of said request methods, the plurality of responses in aggregate representing responses that would be appropriate for two or more of the request methods.

21. A method in accordance with claim 20, wherein the step for representing a plurality of responses to the specific request comprises the following:

a specific act of retrieving first response data that represents an appropriate response to the first specific request should the user intend the first specific request to be in accordance with a first request method;

a specific act of retrieving second response data that represents an appropriate response to the second specific request should the user intend the second specific request to be in accordance with a second request method; and a specific act of unifying the first response data and the second response data into a unified data structure.

22. A method in accordance with claim 21, further comprising the following:

a specific act of presenting the first response data and the second response data to the user so the user may review the first and second response data through a single unified user interface.

23. A method in accordance with claim 21, wherein the specific act of retrieving first response data that represents an appropriate response to the first specific request should the user intend the first specific request to be in accordance with a first request method comprises the following:

a specific act of retrieving a first portion of the first response data from a first database, the first portion containing one or more entries from the first database;

a specific act of retrieving a second portion of the first response data from a second database the second portion containing one or more entries from the second database, at least some of the entries in the first portion having a different data structure format that at least some of the entries in the second portion.

24. A method in accordance with claim 21, further comprising:

before the specific act of retrieving the first response data and before the specific act of retrieving the second response data, a specific act of determining that the user input warrants the specific act of retrieving the first response data and the specific act of retrieving the second response data.

25. A method in accordance with claim 20, wherein the specific act of detecting user input that represents a user request for service comprises the following:
   a specific act of detecting dialing input that represents a user request for service.

26. A computer program product for implementing a method in a telephone device that supports multiple request methods and that allows a user to enter a request for service using said request methods, the device accepting user input, the computer program product for implementing a method for retrieving and merging data responsive to the request methods so as to allow the user to enter the user request without requiring that the user specify the request method, the computer program product comprising computer-readable media having stored thereon the following:
   computer-executable instructions for detecting said user input that represents a service request, the meaning of the service request depending on the user's intended request method, wherein detection of the user input comprises the detection of each of a plurality of characters sequentially input by the user as part of the user request, wherein the plurality of characters comprises numerals or letters or a group of numbers or letters and wherein a first character of the plurality of characters represents a first specific request and a second character of the plurality of characters represents a second specific request that refines the first specific request;
   computer-executable instructions for causing first response data to be retrieved, the first response data representing an appropriate response to the first specific request should the user intend the first specific request to be in accordance with a first request method;
   computer-executable instructions for causing second response data to be retrieved, the second response data representing an appropriate response to the first specific request should the user intend the first specific request to be in accordance with a second request method;
   computer-executable instructions for causing the first response data and the second response data to be presented to the user so the user may review the first and second response data through a first single unified user interface after accessing a plurality of databases of said request methods;
   computer-executable instructions for causing third response data to be retrieved, the third response data representing an appropriate response to the second specific request should the user intend the second specific request to be in accordance with a third request method;
   computer-executable instructions for causing fourth response data to be retrieved, the fourth response data representing an appropriate response to the second specific request should the user intend the second specific request to be in accordance with a fourth request method; and
   computer-executable instructions for causing the third response data and the fourth response data to be presented to the user so the user may review the third and fourth response data through a second single unified user interface.

27. A computer-readable medium in accordance with claim 26, wherein the computer-readable media is one or more physical storage media.

28. In a telephonic device that supports multiple dialing methods and that allows a user to enter dialing input using said dialing methods, the device accepting user input, a method for retrieving and merging data responsive to the dialing methods so as to allow the user to dial using the dialing methods without requiring that the user specify the dialing method, comprising the following:
   a specific act of detecting said user input that represents dialing input, the meaning of the dialing input depending on the user's intended dialing method, wherein the specific act of detecting said user input comprises a specific act of detecting each of a plurality of characters sequentially input by the user as part of the dialing input, wherein the plurality of characters comprises numerals or letters or a group of numbers or letters and wherein a first character of the plurality of characters represents a first specific dialing input request and a second character of the plurality of characters represents a second specific dialing input request that refines the first separate dialing input request;
   a specific act of retrieving first response data that represents an appropriate response to the first specific dialing input request should the user intend the first specific dialing input request to be in accordance with a first dialing method;
   a specific act of retrieving second response data that represents an appropriate response to the first specific dialing input request should the user intend the first specific dialing input request to be in accordance with a second dialing method;
   a specific act of unifying the first response data and the second response data into a first unified data structure after accessing a plurality of databases of said dialing methods;
   a specific act of retrieving third response data that represents an appropriate response to the second specific dialing input request should the user intend the second specific dialing input request to be in accordance with a third dialing method;
   a specific act of retrieving fourth response data that represents an appropriate response to the second specific dialing input request should the user intend the second specific dialing input request to be in accordance with a fourth dialing method; and
   a specific act of unifying the third response data and the fourth response data into a second unified data structure.

29. A method in accordance with claim 28, further comprising the following:
   a specific act of presenting the first response data and the second response data to the user so the user may review the first and second response data through a single unified user interface.

30. In a telephonic device that supports multiple dialing methods allows a user to enter dialing input using said dialing methods, the device accepting user input, a method for retrieving and merging data responsive to the dialing methods so as to allow the user to dial using the dialing methods without requiring that the user specify the dialing method, comprising the following:
   a specific act of detecting said user input that represents dialing input, the meaning of the dialing input depending on the user's intended dialing method, wherein the specific act of detecting said user input comprises a specific act of detecting each of a plurality of characters sequentially input by the user as part of the dialing input, wherein the plurality of characters comprises numerals or letters or a group of numbers or letters and wherein a first character of the plurality of characters represents a first specific dialing input request and a second character of the plurality of characters represents a second specific dialing input request that refines the first separate dialing input request; and for the first and second specific dialing input request represented by the first and second characters sequentially input by the user, a step for retrieving and presenting a plurality of responses to the first and second specific dialing input requests after accessing a plurality of databases of said dialing methods, the plurality of responses in aggregate representing responses that would be appropriate for two or more of the dialing methods.

31. A computer program product for use in a telephonic device that supports multiple dialing methods allows a user to enter dialing input using said dialing methods, the device accepting user input, the computer program product for implementing a method for retrieving and merging data responsive to the dialing methods so as to allow the user to dial using the dialing methods without requiring that the user specify the dialing method, the computer program product comprising computer-readable media having stored thereon the following:

computer-executable instructions for detecting said user input that represents dialing input, the meaning of the dialing input depending on the user's intended dialing method, wherein detection of the user input comprises the detection of each of a plurality of characters sequentially input by the user as part of the dialing input, wherein the plurality of characters comprises numerals or letters or a group of numbers or letters and wherein a first character of the plurality of characters represents a first specific dialing input request and a second character of the plurality of characters represents a second specific dialing input request that refines the first separate dialing input request;

computer-executable instructions for causing first response data to be retrieved, the first response data representing an appropriate response to the first specific dialing input request should the user intend the first specific dialing input to be in accordance with a first dialing method;

computer-executable instructions for causing second response data to be retrieved, the second response data representing an appropriate response to the first specific dialing input request should the user intend the first specific dialing input to be in accordance with a second dialing method;

computer-executable instructions for causing the first response data and the second response data to be presented to the user so the user may review the first and second response data through a first single unified user interface after accessing a plurality of databases of said dialing methods;

computer-executable instructions for causing third response data to be retrieved, the third response data representing an appropriate response to the second specific dialing input request should the user intend the second specific dialing input to be in accordance with a third dialing method;

computer-executable instructions for causing fourth response data to be retrieved, the fourth response data representing an appropriate response to the second specific dialing input request should the user intend the second specific dialing input to be in accordance with a fourth dialing method; and computer-executable instructions for causing the third response data and the fourth response data to be presented to the user so the user may review the third response data and the fourth response data through a second single unified user interface.

32. A computer program product in accordance with claim 31, wherein the computer-readable media is one or more physical storage media.

33. A telephone device that supports multiple request methods and that allows a user to enter a request using said request methods, the device merging the request methods so as to allow the user to enter the request without requiring that the user specify the request method, the telephonic device comprising the following:

a data source representing data appropriate for one or more request methods;

an input user interface configured to detect said user input in the form of a plurality of sequentially input characters, wherein the plurality of characters comprises numerals or letters or a group of numbers or letters and wherein a first character of the plurality of characters represents a first specific request and a second character of the plurality of characters represents a second specific request that refines the first specific request, the meaning of the first or second specific request depending on the user's intended request method;

a first filter configured to return, for the first specific request entered by the user, at least some of the data in the data source that represents an appropriate response to the first specific request should the user intend to use a first request method;

a second filter configured to return, for the second request entered by the user, at least some of the data source that represents an appropriate response to the second specific request should the user intend to use a second request method; and a single unified user interface configured to receive, for each specific request entered by the user, at least some of the data returned from the first and second filters, and configured to present the received data to the user in a unified fashion after accessing a plurality of databases of said request methods.

34. A device in accordance with claim 33, wherein the first filter and the second filter are the same filter module.

35. A device in accordance with claim 33, wherein the first filter and the second filter are different filter modules.

36. A telephonic device that supports multiple dialing methods and that allows a user to enter dialing input using said dialing methods, the telephonic device merging the dialing methods so as to allow the user to dial using the dialing methods without requiring that the user specify the dialing method, the telephonic device comprising the following:

a data source representing dialing information;

an input user interface configured to detect said user input that represents a specific dialing input request in the form of a plurality of sequentially input characters, wherein the plurality of characters comprises numerals or letters or a group of numbers or letters and wherein a first character of the plurality of characters represents a first specific dialing input request and a second character of the plurality of characters represents a second specific dialing input request that refines the first separate dialing input request, the meaning of the specific dialing input request depending on the user's intended dialing method;

a first filter configured to return, for the first specific dialing input request entered by the user, at least some of the dialing information in the data source that conforms with the first specific dialing input should the user intend to use a first dialing method;

a second filter configured to return, for the second specific dialing input request entered by the user, at least some of the dialing information in the data source that conforms with the second specific dialing input should the user intend to use a second dialing method; and a single unified user interface configured to receive, for each specific dialing input request entered by the user, at least some of the dialing information returned from the first and second filters, and configured to present the received data to the user in a unified fashion after accessing a plurality of databases of said dialing methods.

* * * * *

UNITED STATES PATENT AND TRADEMARK OFFICE
CERTIFICATE OF CORRECTION

PATENT NO. : 7,072,461 B2  Page 1 of 1
APPLICATION NO. : 09/945588
DATED : July 4, 2006
INVENTOR(S) : Padawer et al.

It is certified that error appears in the above-identified patent and that said Letters Patent is hereby corrected as shown below:

In column 2, line 51, delete "icequest" and insert -- request --, therefor.

In column 6, line 65, delete "11 5," and insert -- 115, --, therefor.

In column 11, line 44, delete "requester" and insert -- requestor --, therefor.

In column 11, line 54, delete "requester" and insert -- requestor --, therefor.

In column 14, line 59, in Claim 10, after "intend" insert -- the --.

In column 15, line 23, in Claim 13, after "should" delete "to" and insert -- the --, therefor.

In column 16, line 8, in Claim 20, after "detecting" insert -- said --.

In column 18, line 55, in Claim 30, after "methods" insert -- and that --.

In column 19, line 17, in Claim 31, after "methods" insert -- and that --.

Signed and Sealed this

Thirtieth Day of March, 2010

David J. Kappos
*Director of the United States Patent and Trademark Office*